US010560679B2

(12) United States Patent
Zhao et al.

(10) Patent No.: US 10,560,679 B2
(45) Date of Patent: Feb. 11, 2020

(54) DEFORMATION DETECTION AND AUTOMATIC CALIBRATION FOR A DEPTH IMAGING SYSTEM

(71) Applicant: Microsoft Technology Licensing, LLC, Redmond, WA (US)

(72) Inventors: Jian Zhao, Kenmore, WA (US); Michael Bleyer, Seattle, WA (US); Raymond Kirk Price, Redmond, WA (US); Denis Demandolx, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 15/252,129

(22) Filed: Aug. 30, 2016

(65) Prior Publication Data
US 2018/0061034 A1    Mar. 1, 2018

(51) Int. Cl.
*G06T 7/80* (2017.01)
*G06K 9/00* (2006.01)
(Continued)

(52) U.S. Cl.
CPC ....... *H04N 13/128* (2018.05); *G02B 27/0172* (2013.01); *G02B 2027/014* (2013.01); *G02B 2027/0138* (2013.01)

(58) Field of Classification Search
None
See application file for complete search history.

(56) References Cited

U.S. PATENT DOCUMENTS 6,219,063 B1    4/2001    Bouguet et al.
8,401,242 B2    3/2013    Newcombe et al.
(Continued)

FOREIGN PATENT DOCUMENTS

WO    2013076583 A2    5/2013
WO    2014055240 A2    4/2014

OTHER PUBLICATIONS

Dang, et al., "Continuous Stereo Self-Calibration by Camera Parameter Tracking", In Journal of IEEE Transactions on Image Processing, vol. 18, No. 7, Jul. 2009, pp. 1536-1550.
(Continued)

*Primary Examiner* — Edemio Navas, Jr.
(74) *Attorney, Agent, or Firm* — Arent Fox LLP

(57) ABSTRACT

Disclosed are an apparatus and a method for detecting deformation of a structured light depth imaging system and automatic re-calibration for the depth imaging system. In one embodiment, a depth imaging device includes a light projector, a camera and a processor. The light projector emits light corresponding to a projected pattern image having a plurality of features with known locations in the projected pattern image. The camera captures the light reflected by an environment of the depth imaging device and generates a reflected pattern image as a two-dimensional (2D) projection of the environment. The reflected pattern image includes a plurality of features that correspond to the features of the projected pattern image. The processor detects a misalignment for a distance or an orientation between the light projector and the camera based on a relationship between the features in the projected pattern image and the features in the reflected pattern image.

26 Claims, 8 Drawing Sheets

(51) Int. Cl.
*G06K 9/32* (2006.01)
*G06T 7/00* (2017.01)
*H04N 13/128* (2018.01)
*G02B 27/01* (2006.01)

(56) References Cited

U.S. PATENT DOCUMENTS

| | | | |
|---|---|---|---|
| 8,818,132 | B2 | 8/2014 | Zhang et al. |
| 9,124,873 | B2 | 9/2015 | Liu et al. |
| 9,210,404 | B2 | 12/2015 | Hall |
| 9,210,417 | B2 | 12/2015 | Hall |
| 9,256,943 | B2* | 2/2016 | Appia ............... G06T 7/0018 |
| 9,661,308 | B1* | 5/2017 | Wang ................. G06T 7/521 |
| 2012/0105585 | A1 | 5/2012 | Masalkar et al. |
| 2013/0329012 | A1* | 12/2013 | Bartos ............... G01B 21/042 |
| | | | 348/46 |
| 2015/0221093 | A1* | 8/2015 | Sagawa ............. G01B 11/2513 |
| | | | 345/419 |
| 2016/0034042 | A1* | 2/2016 | Joo ................... G02B 27/0172 |
| | | | 345/633 |

OTHER PUBLICATIONS

Kalisperakis, et al., "A Structured-Light Approach For The Reconstruction Of Complex Objects", In Journal of Geoinformatics CTU FCE, vol. 6, Sep. 12, 2011, 8 pages.

Zhang, et al., "Real-Time Scalable Depth Sensing With Hybrid Structured Light Illumination", In Journal of IEEE Transactions on Image Processing, vol. 23, No. 1, Jan. 2014, pp. 97-109.

Kainz, et al., "OmniKinect: Real-Time Dense Volumetric Data Acquisition and Applications", In Proceedings of 18th ACM Symposium on Virtual Reality Software and Technology, Dec. 10, 2012, pp. 25-32.

Alhwarin, et al., "IR Stereo Kinect: Improving Depth Images by Combining Structured Light with IR Stereo", In Proceedings of 13th Pacific Rim International Conference on Artificial Intelligence, Dec. 1, 2014, 9 pages.

* cited by examiner

DEFORMATION DETECTION AND AUTOMATIC CALIBRATION FOR A DEPTH IMAGING SYSTEM

BACKGROUND

Depth sensing technology can be used to determine a person's location in relation to nearby objects or to generate an image of a person's immediate environment in three dimensions (3D). One application in which depth sensing technology may be used is in head-mounted display (HMD) devices and other types of near-eye display (NED) devices. Depth sensing technology can employ a stereo vision, structured light, structured stereo, or time-of-flight (ToF) depth camera. With structured light based depth sensing technology, a light source emits a light pattern onto nearby objects, and a camera captures the light after it reflects off surfaces of the objects. The sensor observes the geometric deformation of the illumination pattern, and a processor then calculates the 3D map of the scene. Such a measurement can be processed with other similar measurements to create a map of physical surfaces in the user's environment (called a depth image or depth map) and, if desired, to render a 3D image of the user's environment.

A depth imaging system (also referred to as depth sensing system) can include a light source for providing structured light. Such a system is referred to as structured light depth imaging system. Structured light is a process of using a projector (which can be part of the light source) to project a known pattern of light onto a scene. The light is reflected by the scene and captured by an imaging camera. The light pattern captured by the depth imaging camera is different from the projected known pattern because of the scene geometry. Based on the differences between the deformed pattern and the projected known pattern, the depth imaging system can calculate the depth information of the scene.

However, the accuracy of the depth information depends on a precise geometric alignment between the projector and the camera. In particular, to produce accurate depth information, the depth imaging system needs maintain the 3D positions and orientations of the projector and the camera relative to each other at the time of camera calibration. The information on the 3D positions and orientations of the projector and the camera is collectively referred to as extrinsic calibration information. Even a very small physical deformation of the depth imaging system can lead to inaccurate depth information. For example, a deformation can be caused by a change of an environment temperature, a user dropping the depth imaging system, or even mounting strain during camera assembly. The deformation causes a change of extrinsic calibration information (e.g., a distance or an orientation of the projector and the camera relative to each other). Because the system uses the original extrinsic calibration information to generate the depth information, the depth information is no longer accurate.

SUMMARY

Introduced here are at least one apparatus and at least one method (collectively and individually, "the technique introduced here") for detecting deformation of a depth imaging system and automatic re-calibration for the depth imaging system. In some embodiments, a depth imaging device includes a light projector, a camera and a processor. The depth imaging device can include multiple cameras. For example, the device can include passive stereo cameras or active stereo cameras. Active cameras are cameras using a specific active illumination (e.g., laser). In contrast, passive cameras are cameras relying on the natural illumination of the scene. The light projector emits light corresponding to a projected pattern image having a plurality of features with known locations in the projected pattern image. The camera captures the light reflected by environment in front of the depth imaging device and generates a reflected pattern image as a two-dimensional (2D) projection of the environment. The reflected pattern image includes a plurality of features that correspond to the features of the projected pattern image. If the camera has been physically deformed, the processor detects a misalignment between the orientation between the light projector and the camera based on a relationship between the features in the projected pattern image and the features in the reflected pattern image.

The processor can further correct the misalignment by updating a set of extrinsic calibration parameters. The extrinsic calibration parameters include information about the distance or the orientation between the light projector and the camera relative to each other. The processor can further search for pairs of matching features from the original pattern image and reflected pattern image. Based on the matching features and the updated set of extrinsic calibration parameters, the processor can generate a depth map. The depth map includes pixel values that correspond to depths of objects of an environment relative to the device.

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
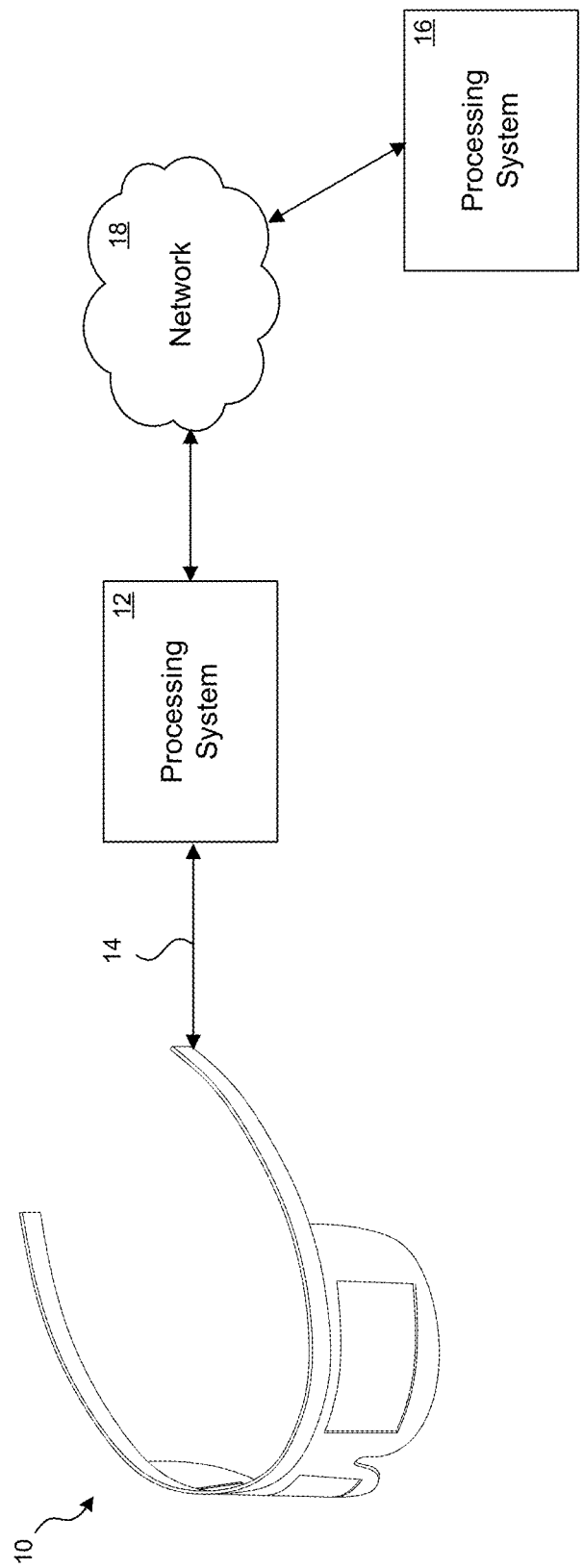
FIG. 1 shows an example of an environment in which a virtual reality (VR) or augmented reality (AR) enabled head-mounted display device (hereinafter "HMD device") can be used.

In this description, references to "an embodiment," "one embodiment" or the like mean that the particular feature, function, structure or characteristic being described is included in at least one embodiment introduced here. Occurrences of such phrases in this specification do not necessarily all refer to the same embodiment. On the other hand, the embodiments referred to also are not necessarily mutually exclusive.

The following description generally assumes that a "user" of a display device is a human. Note, however, that a display device of the disclosed embodiments can potentially be used by a user that is not human, such as a machine or an animal. Hence, the term "user" can refer to any of those possibilities, except as may be otherwise stated or evident from the context. Further, the term "optical receptor" is used here as a general term to refer to a human eye, an animal eye, or a machine-implemented optical sensor designed to detect an image in a manner analogous to a human eye.

Virtual reality (VR) or augmented reality (AR) enabled head-mounted display (HMD) devices and other near-to-eye display systems may include transparent display elements that enable users to see concurrently both the real world around them and AR content displayed by the HMD devices. An HMD device may include components such as light-emission elements (e.g., light emitting diodes (LEDs)), waveguides, various types of sensors, and processing electronics. HMD devices may further include one or more imager devices to generate images (e.g., stereo pair images for 3D vision) in accordance with the environment of a user wearing the HMD device, based on measurements and calculations determined from the components included in the HMD device.

An HMD device may also include a depth imaging system (also referred to as depth sensing system or depth imaging device) that resolves distance between the HMD device worn by a user and physical surfaces of objects in the user's immediate vicinity (e.g., walls, furniture, people and other objects). The depth imaging system may include a structured light, structured stereo, passive stereo, or ToF camera that is used to produce a 3D image of the scene. The captured image has pixel values corresponding to the distance between the HMD device and points of the scene.

The HMD device may include an imager device that generates holographic images based on the resolved distances, for example, so that holographic objects appear at specific locations relative to physical objects in the user's environment. The HMD device may also have one or more display devices to display the generated images overlaid on the field of view of an optical receptor of a user when the HMD device is worn by the user. Specifically, one or more transparent waveguides of the HMD device can be arranged so that they are positioned to be located directly in front of each eye of the user when the HMD device is worn by the user, to emit light representing the generated images into the eyes of the user. With such a configuration, images generated by the HMD device can be overlaid on the user's three-dimensional view of the real world.

FIGS. 1 through 8 and related text describe certain embodiments of an illumination module in the context of near-to-eye display systems. However, the disclosed embodiments are not limited to near-to-eye display systems and have a variety of possible applications, including any active illumination systems (i.e., actively using light sources) such as used in active light projection systems or any active camera modules. All such applications, improvements, or modifications are considered within the scope of the concepts disclosed here.

FIG. 1 schematically shows an example of an environment in which an HMD device can be used. In the illustrated example, the HMD device 10 is configured to communicate data to and from an external processing system 12 through a connection 14, which can be a wired connection, a wireless connection, or a combination thereof. In other use cases, however, the HMD device 10 may operate as a standalone device. For example, the HMD device 10 can include an internal processing system (e.g., onboard processor) to conduct processes disclosed here. The connection 14 can be configured to carry any kind of data, such as image data (e.g., still images and/or full-motion video, including 2D and 3D images), audio, multimedia, voice, and/or any other type(s) of data. The processing system 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 12 may communicate with one or more other processing systems 16 via a network 18, which may be or include, for example, a local area network (LAN), a wide area network (WAN), an intranet, a metropolitan area network (MAN), the global Internet, or combinations thereof.

Figure 2:
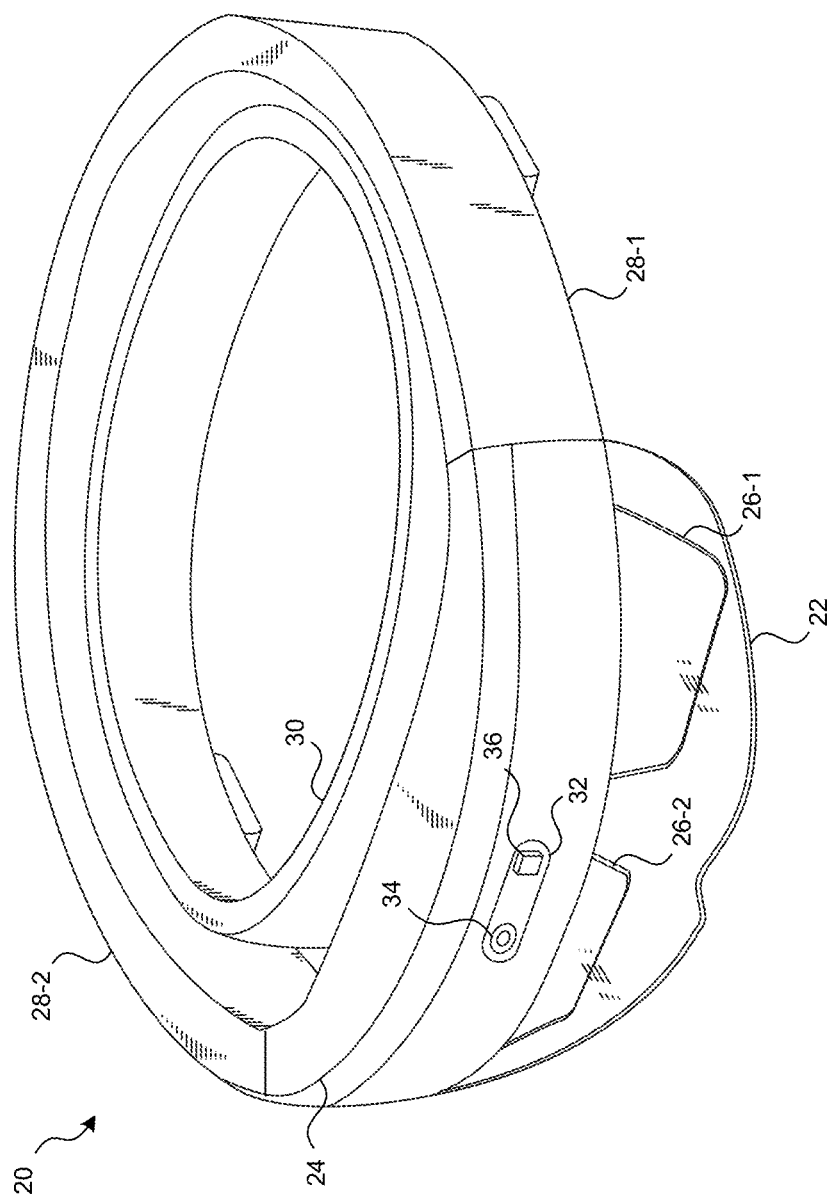
FIG. 2 illustrates a perspective view of an example of an HMD device.

FIG. 2 shows a perspective view of an HMD device 20 that can incorporate the features being introduced here, according to certain embodiments. The HMD device 20 can be an embodiment of the HMD device 10 of FIG. 1. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which a sensor assembly 32 and other components can be attached. In some embodiments the sensor assembly 32 is contained within the visor assembly 22 and mounted to an interior surface of the chassis 24 via a lightweight metal frame (not shown). A circuit board (not shown in FIG. 2) bearing electronics components of the HMD 20 (e.g., microprocessor, memory) can also be mounted to the chassis 24 within the visor assembly 22.

The sensor assembly 32 includes a depth camera 34 and an associated illumination module 36 of a depth imaging system. The illumination module 36 emits light to illuminate a scene. Some of the light reflects off surfaces of objects in the scene, and returns back to the depth camera 34. The depth camera 34 captures the reflected light that includes at least a portion of the light from the illumination module 36.

The "light" emitted from the illumination module 36 is electromagnetic radiation suitable for depth sensing and should not directly interfere with the user's view of the real world. As such, the light emitted from the illumination module 36 is typically not part of the human-visible spectrum. Examples of the emitted light include infrared (IR) light to make the illumination unobtrusive. Sources of the light emitted by the illumination module 36 may include LEDs such as super-luminescent LEDs, laser diodes, or any other semiconductor-based light source with sufficient power output.

The depth camera 34 may be or include any image sensor configured to capture light emitted by an illumination module 36. The depth camera 34 may include a lens that gathers reflected light and images the environment onto the image sensor. An optical bandpass filter may be used to pass only the light with the same wavelength as the light emitted by the illumination module 36. Any of various approaches known to persons skilled in the art can be used for determining the corresponding depth calculations.

The HMD device 20 includes electronics circuitry (not shown in FIG. 2) to control the operations of the depth camera 34 and the illumination module 36, and to perform associated data processing functions. The circuitry may include, for example, one or more processors and one or more memories. As a result, the HMD device 20 can provide surface reconstruction to model the user's environment, or be used as a sensor to receive human interaction information. With such a configuration, images generated by the HMD device 20 can be properly overlaid on the user's 3D view of the real world to provide a so-called augmented reality. Note that in other embodiments the aforementioned components may be located in different locations on the HMD device 20. Additionally, some embodiments may omit some of the aforementioned components and/or may include additional components not discussed above nor shown in FIG. 2. In some alternative embodiments, the aforementioned depth imaging system can be included in devices that are not HMD devices. For example, depth imaging systems can be used in motion sensing input devices for computers or game consoles, automotive sensing devices, earth topography detectors, robots, etc.

Figure 3:
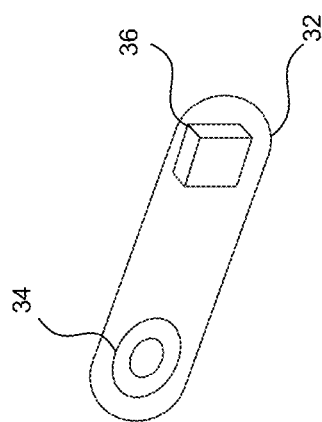
FIG. 3 shows a portion of a sensor assembly of an HMD device including a depth camera and an illumination module.

FIG. 3 shows a portion of the sensor assembly 32 of the HMD device 20. In particular, the sensor assembly 32 includes sensors and electronics mounted to a circuit board, which can be mounted to the chassis 24 as mentioned above. The sensors mounted to the circuit board include the depth camera 34 and the illumination module 36. Other sensors that may be included in the sensor assembly 32 but are not shown in the figures or discussed further may include head-tracking cameras, visible spectrum cameras, ambient light sensors, and the like. Some or all of these other sensors may also be mounted to the sensor assembly 32.

The locations and positions of the illumination module 36 and the depth camera 34 relative to each other as shown in FIG. 3 are merely examples of a configuration used for depth sensing; other configurations are possible in the context of the technique introduced here.

Deformation of Depth Imaging System Leads to Inaccurate Depth Information

Figure 4:
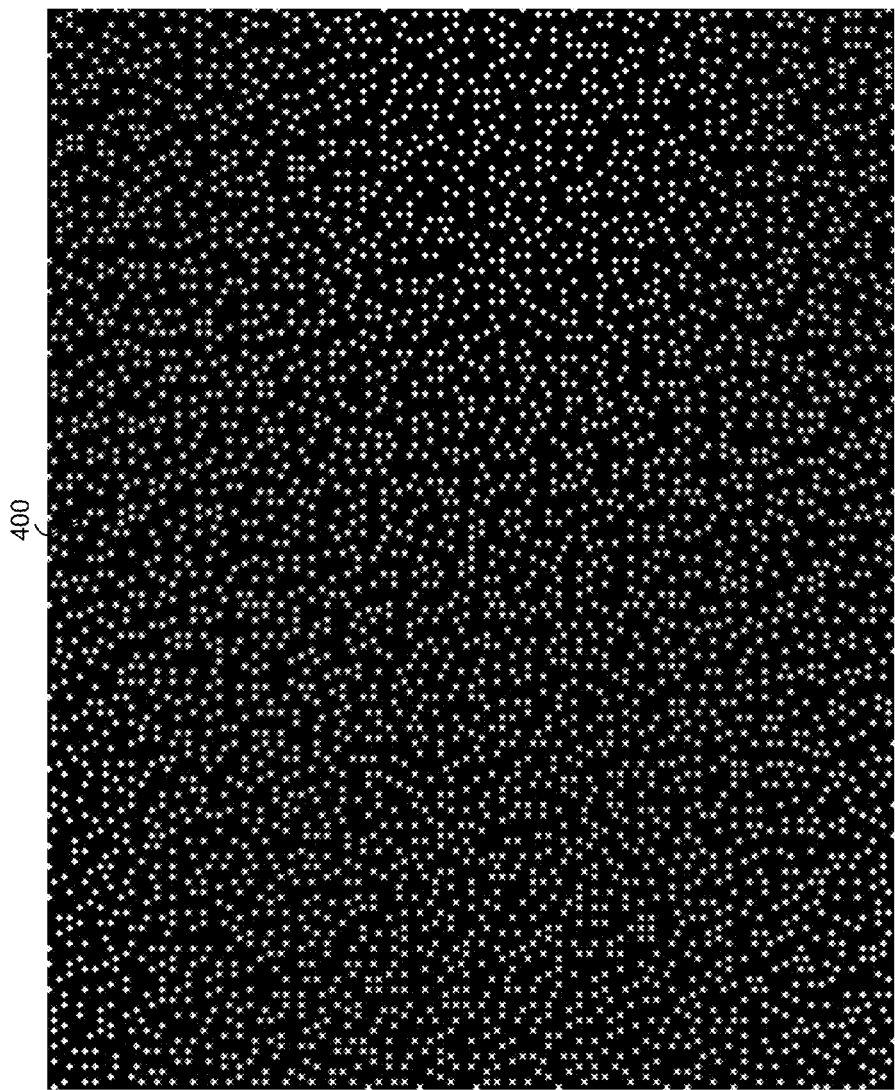
FIG. 4 shows a speckle pattern as an example of a structured light pattern that can be produced in a structured light process.

A depth imaging system, such as may be used in an HMD, can include a light source for providing structured light to project a known pattern of light onto a scene. FIG. 4 shows a speckle pattern as an example of a structured light pattern that can be produced in a structured light process. The speckle pattern 400 (also referred to as dot pattern or pattern of dots) can be generated by, e.g., diffractive optical elements (DOEs). When the environment reflects the light, the pattern illuminated by the structured light source is deformed prior to the pattern being captured by the depth camera. The depth imaging system can calculate the depths of surfaces and the environment, relative to the imaging system, based on the displacements of the dots in the pattern 400, from the known speckle pattern 400 being projected to a deformed pattern captured by the depth camera.

Although various embodiments disclose a structured light source projecting a speckle pattern including a plurality of dots as an example, any of various patterns known to persons skilled in the art could be used as the pattern for structured light. For example, the technology disclosed here can be applied to a pattern including objects or features with different shapes.

The depth imaging system includes an optical projector to project the dot pattern onto a scene. The light is reflected by the scene and captured by a sensing camera. Based on differences between the captured pattern and the known pattern being projected, the depth imaging system can calculate the depth information of the scene (also referred to as depth map or depth image).

Figure 5:
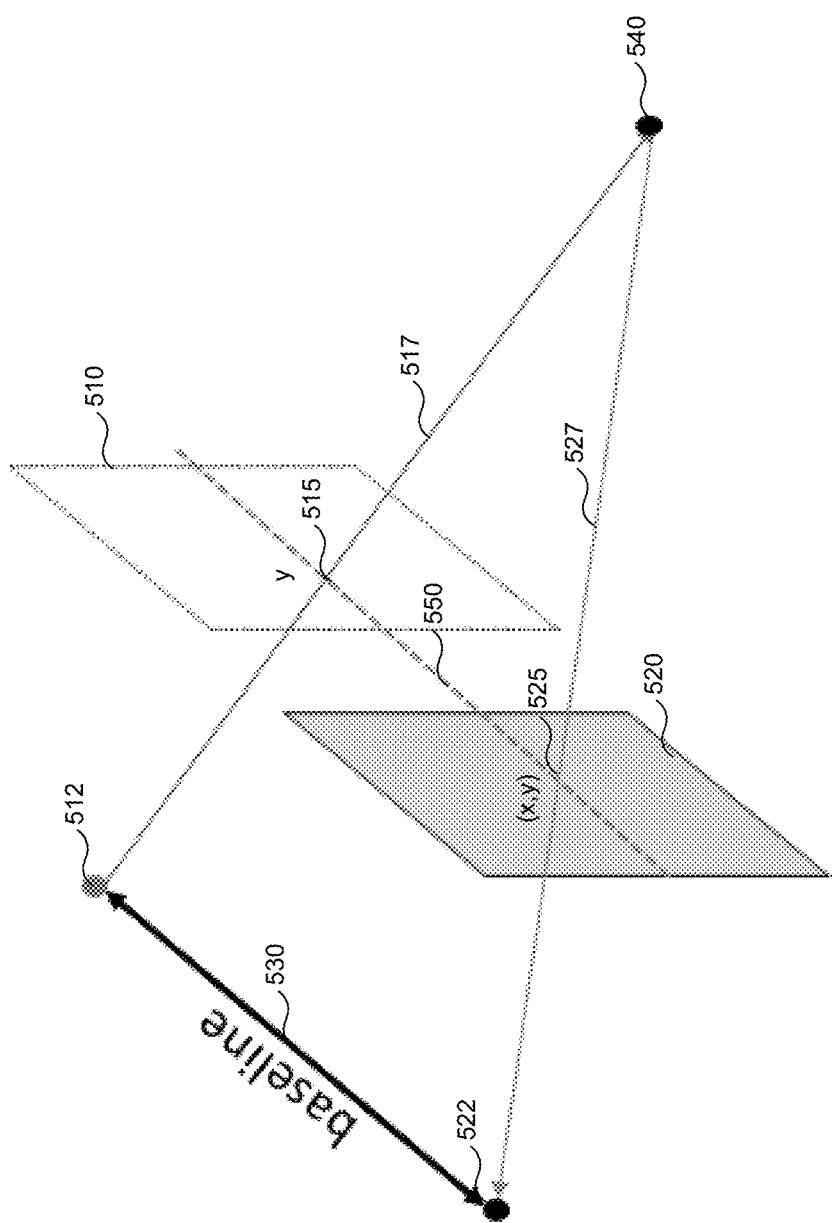
FIG. 5 shows an example of a structured light system for converting 2D stereo information into 3D depth information.

In order to provide an accurate depth map, the structured light depth imaging system needs to maintain the 3D position and orientation of the projector and the camera relative to each other as defined at the time of calibration. FIG. 5 shows an example of a structured light system for converting 2D stereo information into 3D depth information, illustrating the positions and orientations of a projector and a camera of the system.

The projector can be treated as a virtual camera that projects the same image, and is represented by a virtual camera image plane 510. The actual (non-virtual) camera of the system is represented by a camera image plane 520. An image plane of an optical component (e.g., a camera or a virtual camera) is a plane where the optical component captures a 2D projection of the 3D environment.

The virtual and non-virtual cameras form a stereo pair. Point 522 represents a center of symmetry of a camera lens (also referred to as optical center) of the non-virtual camera. Point 512 represents an optical center of the virtual camera. Both the virtual and non-virtual cameras point toward a point of interest 540. Point 515 is a projection of point of interest 540 onto the virtual camera image plane 510. Point 525 is a projection of point of interest 540 onto the non-virtual camera image plane 520.

If the projection point 515 on image plane 510 and the projection point 525 on image plane 520 are known, their projection lines are also known. The projection line for projection point 515 is the projection line 517, which connects the optical center point 512 and the projection point 515. Similarly, the projection line for projection point 525 is the projection line 527, which connects the optical center point 522 and the projection point 525. Since the two projection points 515 and 525 correspond to the same point of interest 540 in the 3D (real) world, the projection lines 517 and 527 intersect at the point 540. In other words, the 3D world coordinates of the point of interest 540 can calculated from the 2D coordinates of the two projection points 515 and 525 on the image planes 510 and 520. The process of converting the 2D coordinates on the stereo pair of image planes into a set of 3D coordinates in the 3D world is called triangulation.

Thus, the system can calculate depth information via the triangulation process through the stereo pair (similar to human depth perception). During the triangulation process for converting stereo information into depth information, the system uses the extrinsic calibration information to re-project the image of the non-virtual camera such that the image planes 510 and 520 of the virtual and non-virtual cameras lie on the same plane and that the baseline 530 is parallel to the plane shared by planes 510 and 520, as illustrated in FIG. 5.

In such a setup, a matching point of a pixel <x,y> at a horizontal scanline 550 on the non-virtual camera image plane 520 is guaranteed to lie at the same horizontal scanline 550 on the virtual camera image plane 510, as shown in FIG. 5. This is called a rectification process, which simplifies the correspondence search (i.e., finding a pixel on image plane 510 that corresponding to the pixel <x,y> on image plane 520) to a one-dimensional (1D) problem and is computationally efficient.

However, the extrinsic calibration information of the stereo pair of the virtual and non-virtual cameras can change. For example, a physical deformation of the system can cause changes to the 3D positions and orientations of the stereo pair relative to each other. As a result, the matching point is no longer guaranteed to lie on the same horizontal scanline and the 1D matching process can fail to find a corresponding matching point on the same scanline. Even if a correspondence can be established, the reconstructed depth can be wrong if the corresponding matching point on the scanline is not the best match. Furthermore, the depth estimation can be biased even if the best match is found due to the change of the baseline.

Conventional products try to overcome this problem by making the device as rigid as possible. However, those designs result in heavy and/or bulky products. Heavy or products are prohibitive particularly in the emerging field of wearable display devices. Other products ship with calibration board and calibration software, which are cumbersome to use for end users.

The technique introduced here therefore includes methods and apparatus to overcome the problem by re-rectifying the image in response to a shift of the extrinsic calibration. The depth imaging system disclosed here detects the deformation and also automatically corrects for such deformation by generating new extrinsic calibration parameters. The system can include a runtime module to analyze regular depth frames and perform statistical inference for deformation based on current calibration parameters. The system can also include an automatic calibration module to generate new calibration parameters based on established stereo correspondences and camera intrinsic parameters. In particular, the technique can be used in mobile electronic devices and wearable devices, such as HMDs and other near-to-eye display devices, which are prone to changes of extrinsic calibration. For example, environment temperature, accidental falls or touching the camera or the projector can cause the extrinsic calibration to shift for those mobile electronic devices and wearable devices.

Detection of Extrinsic Calibration Deformation

A depth imaging system (also referred to herein as simply "system") establishes correspondences between pixels of the image planes of a stereo pair, to generate depth information by triangulation. As shown in FIG. 5, for each pixel in the non-virtual camera image plane, the system searches a range of displacement locations of the stored projector image (e.g., in the virtual camera image plane). The system calculates an intensity dissimilarity function for each candidate location using a window centered at the displacement location.

The system finds a matching location with the lowest intensity dissimilarity score. The system calculates the depth of a 3D point being projected on that pixel from the displacement between the matching pair of pixels on the two image planes and computes camera geometry coefficients via triangulation. For a well-calibrated camera-projector pair, both image planes of the stereo pair are parallel to the baseline (the base is the line connecting optical centers of the camera and the projector). In such a situation, potential matchings for any pixel at a scanline on the camera image plane reside in the same scanline on the virtual camera image plane (for the projector), making the searching an efficient process.

If a deformation of the system changes the extrinsic calibration parameters, the matching point is no longer guaranteed to lie on the same horizontal scanline in the virtual camera image plane. As a result, the process of searching corresponding pixels will be much more expensive or even impractical. The system disclosed here detects the deformation that causes the changes (also referred to as distortions) of the extrinsic calibration parameters and generates a new set of extrinsic calibration parameters so that the system can continue to search corresponding pixels at the same scanline.

The system can detect two types of distortions: rotational distortion and translational distortion. Rotational distortion refers to distortion caused by orientations (also referred to as attitude) of the stereo pair relative to each other. For example, a change of roll, pitch or yaw of the camera or projector of the stereo pair can cause rotational distortion. Translational distortion refers to distortion caused by translational displacement between the centers of the camera and projector of the stereo pair.

Figure 6:
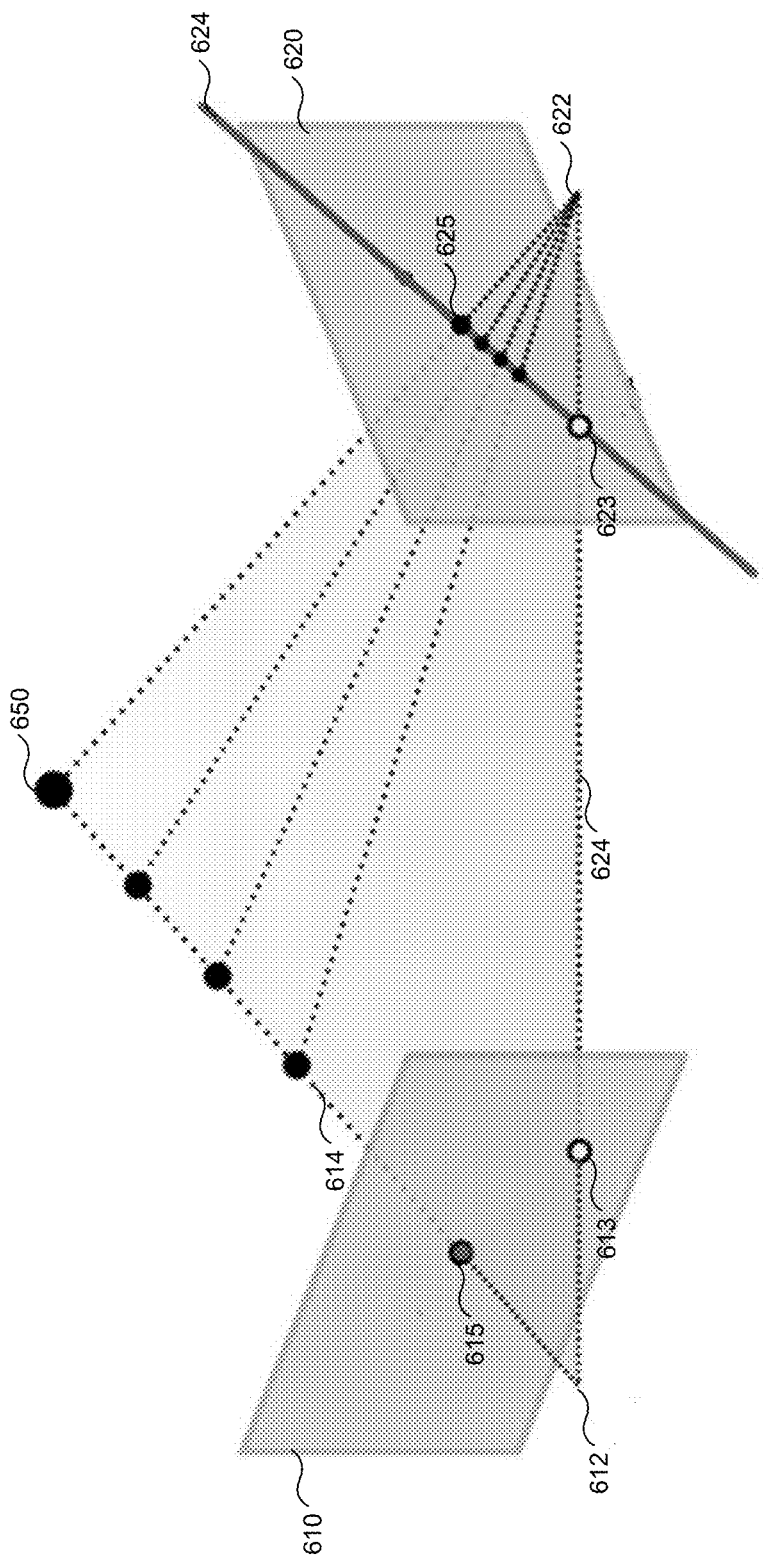
FIG. 6 illustrates a non-rectified stereo pair of a camera and a projector.

Once a deformation of the stereo pair of the camera and project occurs, the matching point no longer resides on the same horizontal scanline in the virtual camera image plane. Such a scenario is referred to as being non-rectified. FIG. 6 illustrates a non-rectified stereo pair of a camera and a projector. The projector (virtual camera) corresponds to the virtual image plane 610 and has an optical center 612. The camera corresponds to the non-virtual camera image plane 620 and has an optical center 622. Both the virtual and non-virtual cameras point toward a point of interest 640 in the 3D environment (also referred to as 3D world). Point 615 is a projection of point of interest 640 onto the virtual image plane 610. Point 625 is a projection of point of interest 640 onto the virtual camera image plane 620.

The baseline 630 connects the optical centers 612 and 622. As shown in FIG. 6, the baseline 630 is no longer parallel the image planes 610 or 620. The baseline 630 intersects the image planes 610 and 620 at points 613 and 623 (called epi-poles). All potential matches for projection point 615 lie on an epipolar line 624 originating from epi-pole point 623. The epipolar line 624 is a projection of a 3D line 614 onto the virtual camera image plane 620, where the 3D line 614 connects the optical center 612, the projection point 625 and the point of interest 640.

Due to the deformation, the matching point identified by the original 1D scanline process is no longer the correct matching point, because the correct matching point does not reside on the scanline due to the deformation. If the deformation is relatively small, the baseline 630 intersects the image plane 620 at a very far end. As a result, the potential epipolar line 624 will be close to a horizontal scanline.

Furthermore, as can be seen from FIG. 6, a region close to the epi-pole 613 in the image plane 610 is denser than another region farther away from the epi-pole 613 in the same image plane 610. As a result, if a projected known pattern includes random dots that are evenly distrusted (e.g., the speckle pattern in FIG. 4), the distribution of the corresponding dots on the camera image plane 610 is less uniform. Therefore, the system can detect a deformation based on a non-uniform spatial distribution of the dots in the captured image. Such a factor for detecting a deformation is referred to as spatial distribution factor.

The system can (alternatively or additionally) detect deformation based on other factors. In some embodiments, the system continues to use the 1D scanline searching process to looking for matching pixel (as if the stereo pair is not deformed). If the system fails to find a matching pixel for a pixel from the virtual image plane along the scanline, the system labels that pixel s an invalidated pixel. If the total number of invalidated pixels exceeds a threshold number, the system can detect a deformation. Such a factor for detecting a deformation is referred to as invalidated pixel factor.

In some embodiments, even if the system finds a matching pixel along the scanline, the system calculates an intensity dissimilarity function for the matching pair of pixels using a window center at the displacement location. The system then calculates a mean and a variance of the normalized scores of the intensity dissimilarity functions for the matching pixels. If the mean and/or the variance are higher than certain threshold value(s), the system can detect a deformation. Such a factor for detecting a deformation is referred to as dissimilarity score factor. Similarly, the system can use matching scores (instead of intensity dissimilarity functions) to measure matching levels for the identified matching pair of pixels. The system can detect a deformation if the matching scores are low.

In some embodiments, the system searches for matching pixels outside (e.g., above or below) the scanline. This process is referred to as 2D plane searching process (comparing to the 1D scanline searching process). Similar to the 1D scanline searching process, the system searches a range of displacement locations in the image plane above or below the scanline for candidate matching pixels. The system calculates an intensity dissimilarity function for each candidate using a window centered at the displacement location. The system finds a matching location with the lowest intensity dissimilarity score. The system compares the dissimilarity scores of matching pixels from the 2D plane searching process with the dissimilarity scores of matching pixels from the 1D scanline searching process. If the dissimilarity scores of matching pixels from the 2D plane searching process are lower than the dissimilarity scores of matching pixels from the 1D scanline searching process, the system can detect a deformation, because the dissimilarity scores suggest that the best matching points are not on the scanline. Such a factor for detecting a deformation is referred to as better match factor.

In some embodiments, the system can detect a deformation based on one or more disclosed factors, such as the spatial distribution factor, invalidated pixel factor, dissimilarity score factor, and better match factor. For example, the system may detect a deformation only if multiple factors are satisfied. Alternatively, the system may detect a deformation if any one or more of a plurality of factors is satisfied.

When there is no distortion to the system, the system conducts the depth calculation using the extrinsic calibration parameters. If there is any indication of possible distortion, the system conducts a process to detect the distortion and re-calibrate (e.g. using the factors disclosed here). For example, if the system finds invalidated pixels, this can be an indication of possible distortion. Once the system identifies the new baseline and new extrinsic calibration parameters, the system continues to conduct the depth calculation using the new set of extrinsic calibration parameters.

Automatic Generation of New Extrinsic Calibration Parameters

Once the system detects a deformation (e.g., a misalignment between the camera and the projector), the system automatically generates a new set of extrinsic calibration parameters without need of any dedicated calibration hardware, so that the system can continue to use the 1D scanline searching process to find matching points for calculating depth information via triangulation. This process is referred to as automatic re-calibration or automatic calibration. The automatic calibration process does not require involvement of a human.

The system conducts an extended search to find the best matches for all the pixels representing the dots of the original projected pattern. The range of the search is no longer constrained to the scanline. In some embodiments, the range is extended a few lines above and below the scanline. The system obtains a set of correct matches $(x_1^i, x_2^i, i=1, 2, \ldots n)$ between the projector and camera image planes.

Prior to the deformation, the projection matrices of the camera and the projector are $P_1$ and $P_2$: $P_1=K_1[I\ 0]$; $P_2=K_2[R\ T]$.

$K_1$ and $K_2$ represent the intrinsic parameters of the camera and the projector (e.g., focal length, image sensor format, principal point), which are assumed to remain unchanged during deformation. For simplicity of computation, the optical center of the camera can be assumed as the origin point of the 3D coordinate system. R is a rotation matrix and T is a translation vector. R and T include the initial extrinsic calibration parameters between the stereo pair. The initial extrinsic calibration parameters can be obtained from e.g., an initial calibration process conducted by the manufacturer.

Once the deformation occurs, the intrinsic parameters remain unchanged and the system will generate a new set of extrinsic calibration parameters that are represented by [R' T']. The amount of deformation is represented by $[R_x\ T_x]$, where $R'=R*R_x$, $T'=T+T_x$.

The optical center of the camera is still assumed as the origin point of the 3D coordinate system. Thus, the new projection matrices of the camera and the projector are: $P_1'=K_1[I\ 0]$; $P_2'=K_2[R'\ T']=K_2[R*R_x(T+T_x)]$.

The 3D positions of pattern dots projected onto the environment in the 3D world are $X^i$, the projections of those dots on the camera image plane and the projector image plane are: $p_1^i=P_1'X^i$; $p_2^i=P_2'X^i$.

The system solve $X^i$, $R_x$, $T_x$ by minimizing the energy function:

$$\sum_i (x_1^i - p_1^i)^2 + (x_2^i - p_2^i)^2$$

The new set of extrinsic calibration parameters can be calculated by $R'=R*R_x$, $T'=T+T_x$.

Using the new set of extrinsic calibration parameters, the system re-rectifies the stereo pair of the camera and the projector and resumes using the 1D scanline searching process to find matching pairs of points in the image planes at the same scanline. The system then calculates the depth information of the dots projected into the environment in 3D world, by conducting a triangulation process based on the matching pairs of the points on the image planes.

In some embodiments, the deformation of the system causes more rotational distortion than translational distortion. The system can ignore the translational distortion by, e.g., assuming that $T_x=0$.

Constraints for Small Deformation

Typical structured light systems are extremely sensitive to misalignment between the camera and the projector. The technique disclosed here works particularly well for small physical deformations, such as deformation caused by minor impact events (i.e. drops of the devices), or physical shift due to operation temperature drifts (e.g., due to thermal expansion of the devices). The system can constrain the process of automatic re-calibration to such small physical deformations. For example, the system can add containing terms to the energy function to be optimized, to ensure that the process of automatic recalibration only searches for small deformation during the minimization stage.

$$\sum_i (x_1^i - p_1^i)^2 + (x_2^i - p_2^i)^2 + \alpha \|R_x\| + \beta \|T_x\|.$$

Figure 7:
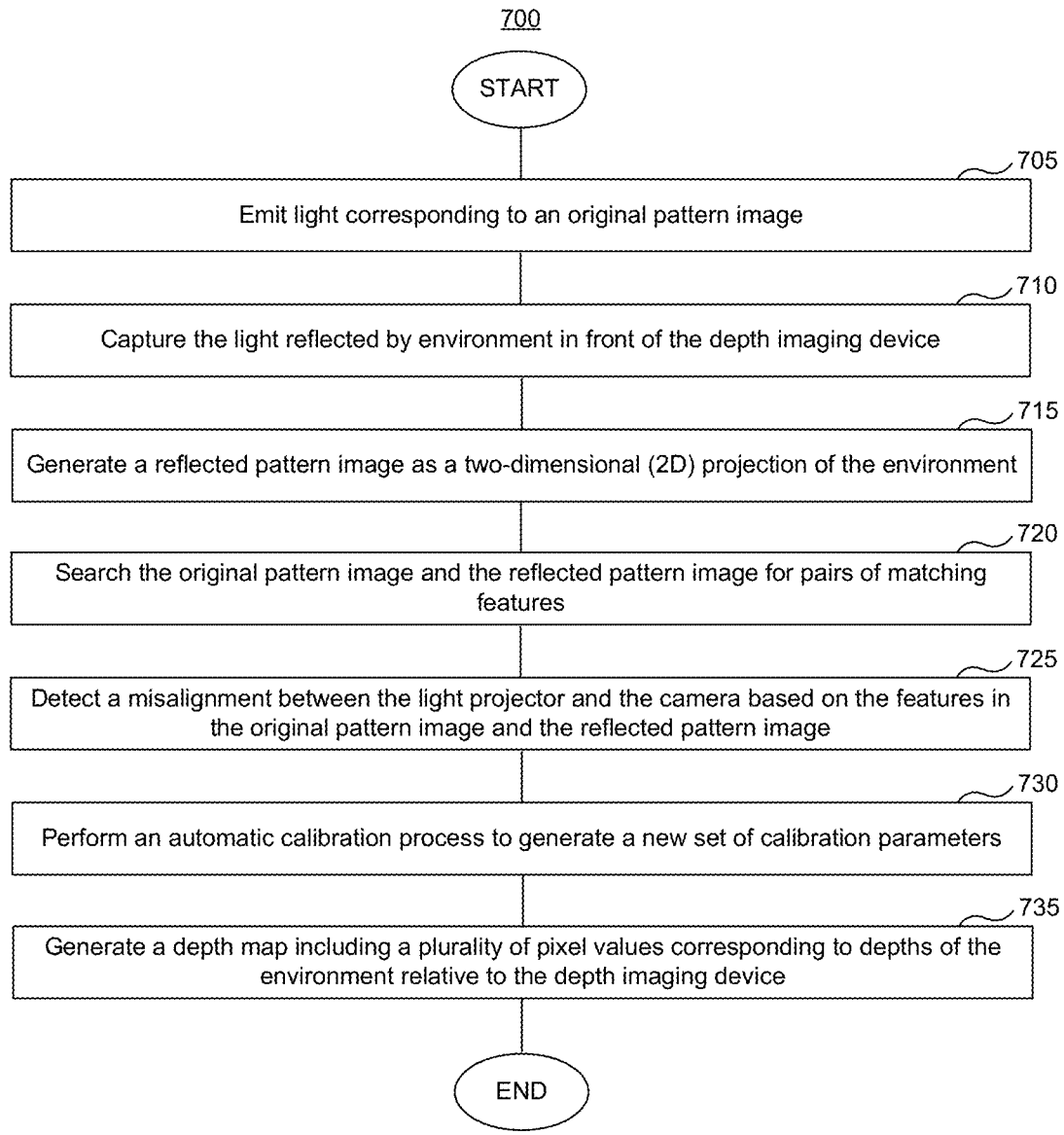
FIG. 7 illustrates an example of a process of deformation detection and recalibration for a depth imaging system.

FIG. 7 illustrates an example of a process 700 of deformation detection and recalibration for a depth imaging system. In step 705 of the process 700, a light projector of the depth imaging system emits light corresponding to an original pattern image. The original pattern image has a plurality of features with known locations in the original pattern image. In step 710, a camera of the depth imaging system captures the light reflected by environment in front of the depth imaging device. In step 715, the camera generates a reflected pattern image as a two-dimensional (2D) projection of the environment. The reflected pattern image includes a plurality of features that correspond to the features of the original pattern image.

In step 720, a processor of the depth imaging system searches the original pattern image and the reflected pattern image for pairs of matching features. Each pair includes a feature from the original pattern image and another feature from the reflected pattern image. In step 725, the processor detects a misalignment for a distance or an orientation between the light projector and the camera based on the features in the original pattern image and the features in the reflected pattern image.

The detection of the misalignment can be based on one or more factors, such as the disclosed spatial distribution factor, invalidated pixel factor, dissimilarity score factor, or better match factor. For example, the processor can detect the misalignment based on a determination that a spatial distribution of the features in the reflected pattern image is biased toward a direction relative to a spatial distribution of the features in the original pattern image. Alternatively, the processor can detect the misalignment based on a determination that for an individual feature at a scanline in the original pattern image, a best match of the individual feature is not at the same scanline in the reflected pattern image.

In step 730, the processor performs an automatic calibration process to generate a new set of calibration parameters indicative of the distance or the orientation between the light projector and the camera. The automatic calibration process does not involve any intervention from a human user or a human operator. The automatic calibration process does not involve any specialized calibration hardware. In some embodiments, the new set of calibration parameters is generated by minimizing a function indicative of differences between known coordinates of a pair of matching features corresponding to object of the environment and calculated coordinates of projections of the object onto the original pattern image and the reflected pattern image. The function depends on the calibration parameters indicative of the distance or the orientation between the light projector and the camera.

In step 735, the processor generates a depth map including a plurality of pixel values corresponding to depths of the environment relative to the depth imaging device, based on the pairs of matching features and a set of calibration parameters indicative of the distance or the orientation between the light projector and the camera.

Figure 8:
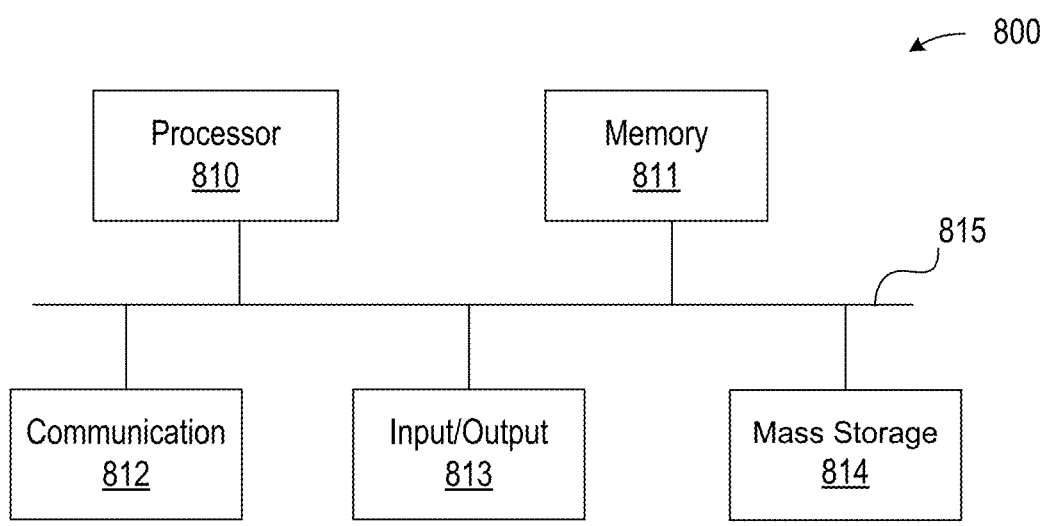
FIG. 8 shows a high-level example of a hardware architecture of a processing system that can be used to implement any one or more of the functional components described herein.

FIG. 8 shows a high-level example of a hardware architecture of a processing system that can be used to implement to perform the disclosed functions (e.g., steps of the process 500 or process 900). One or multiple instances of an architecture such as shown in FIG. 8 (e.g., multiple computers) can be used to implement the techniques described herein, where multiple such instances can be coupled to each other via one or more networks.

The illustrated processing system 800 includes one or more processors 810, one or more memories 811, one or more communication device(s) 812, one or more input/output (I/O) devices 813, and one or more mass storage devices 814, all coupled to each other through an interconnect 815. The interconnect 815 may be or include one or more conductive traces, buses, point-to-point connections, controllers, adapters and/or other conventional connection devices. Each processor 810 controls, at least in part, the overall operation of the processing device 800 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 811 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 814 can be or include one or more hard drives, digital versatile disks (DVDs), flash memories, or the like. Each memory 811 and/or mass storage 814 can store (individually or collectively) data and instructions that configure the processor(s) 810 to execute operations to implement the techniques described above. Each communication device 812 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 800, each I/O device 813 can be or include a device such as a display (which may be a touch screen display), audio speaker, keyboard, mouse or other pointing device, microphone, camera, etc. Note, however, that such I/O devices may be unnecessary if the processing device 800 is embodied solely as a server computer.

In the case of a user device, a communication device 812 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 812 can be or include, for example, any of the aforementioned types of communication devices, a wired Ethernet adapter, cable modem, DSL modem, or the like, or a combination of such devices.

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Examples of Certain Embodiments

Certain embodiments of the technology introduced herein are summarized in the following numbered examples:

1. A depth imaging device including: a light projector that, when in operation, emits light corresponding to a projected pattern image having a plurality of features with known illumination pattern in the projected image; a camera that, when in operation, captures the light after reflection of the light by an environment of the depth imaging device and generates a reflected pattern image as a two-dimensional (2D) projection of the environment, the reflected pattern image including a plurality of features that correspond to the features of the projected image; and a processor to detect a misalignment of a distance or an orientation between the light projector and the camera based on a relationship between the features in the projected image and the features in the reflected pattern image.

2. The device of example 1, wherein the processor corrects the misalignment by updating a set of calibration parameters indicative of the distance or the orientation between the light projector and the camera.

3. The device of example 1 or 2, wherein the processor searches the projected image and the reflected pattern image for pairs of matching features, each pair including a feature from the projected image and a feature from the reflected pattern image, wherein a search result is indicative of a presence of a physical distortion to the depth imaging device.

4. The device of example 3, wherein the processor generates a depth map including a plurality of pixel values corresponding to depths of surfaces in the environment relative to the depth imaging device, based on the pairs of matching features and a set of updated calibration parameters indicative of the distance or the orientation between the light projector and the camera.

5. The device in any of the preceding examples 1 through 4, wherein the processor detects the misalignment based on a determination that a spatial distribution of the features in the reflected pattern image is shifted above or below the horizontal epipolar scanline.

6. The device in any of the preceding examples 1 through 5, wherein the projected image includes a plurality of random dots that are evenly distributed in the projected image; and wherein the processor detects the misalignment based on a determination that a spatial distribution of the features in the reflected pattern image is shifted with respect to the known illumination pattern in the projected image.

7. The device in any of the preceding examples 1 through 6, wherein for an individual feature at a scanline in the projected image, the processor searches for a matching feature corresponding to the individual feature of the projected image at the scanline in the reflected pattern image; and wherein the processor detects the misalignment based on a determination that the individual feature at the scanline in the projected image does not have a matching feature at the scanline in the reflected pattern image.

8. The device in any of the preceding examples 1 through 7, wherein the processor searches the projected image and the reflected pattern image for pairs of matching features, each pair including a feature located at a scanline in the projected image and another feature located at the scanline in the reflected pattern image; and wherein the processor detects the misalignment based on a determination that an average of matching scores of the pairs of matching features is below a threshold value.

9. The device in any of the preceding examples 1 through 8, wherein for an individual feature at a scanline in the projected image, the processor searches for a first matching feature corresponding to the individual feature of the projected image at the scanline in the reflected pattern image; and wherein the processor detects the misalignment based on a determination that a second matching feature in the reflected pattern image is not at the scanline and is a better match for the individual feature than the first matching feature at the scanline in the reflected pattern image.

10. The device in any of the preceding examples 1 through 9, wherein the processor identifies a pair of matching features, the pair of matching features including a first feature from the projected image and a second feature from the reflected pattern image that is a match of the first feature; and wherein the processor corrects the misalignment by updating a set of calibration parameters indicative of the distance or the orientation between the light projector and the camera, based on the pair of matching features and an object in the environment corresponding to the matching features.

11. The device of example 10, wherein the processor updates the set of calibration parameters by minimizing a function indicative of differences between known coordinates of the pair of matching features and calculated coordinates of projections of the object onto the projected image and the reflected pattern image.

12. An apparatus for detecting a deformation, including: means for emitting, by a light projector of a depth imaging device, light corresponding to a projected pattern image having a plurality of features with known locations in the projected pattern image; means for capturing, by a camera, the light reflected by environment of the depth imaging device; means for generating a reflected pattern image as a two-dimensional (2D) projection of the environment, the reflected pattern image including a plurality of features that correspond to the features of the projected pattern image; and means for detecting a misalignment for a distance or an orientation between the light projector and the camera based on a relationship between the features in the projected pattern image and the features in the reflected pattern image.

13. The apparatus of example 12, further including: means for performing a calibration process to update a set of calibration parameters indicative of the distance or the orientation between the light projector and the camera.

14. The apparatus of example 12 or 13, further including: means for searching the projected pattern image and the reflected pattern image for pairs of matching features, each pair including a feature from the projected pattern image and another feature from the reflected pattern image.

15. The apparatus of example 14, further including: means for generating a depth map including a plurality of pixel values corresponding to depths of the environment relative to the depth imaging device, based on the pairs of matching features and a set of calibration parameters indicative of the distance or the orientation between the light projector and the camera.

16. The apparatus in any of the preceding examples 12 through 15, wherein the means for detecting includes: means for detecting the misalignment based on a determination that a spatial distribution of the features in the reflected pattern image is biased toward a direction relative to a spatial distribution of the features in the projected pattern image.

17. The apparatus in any of the preceding examples 12 through 16, wherein the means for detecting includes: means for detecting the misalignment based on a determination that for an individual feature at a scanline in the projected pattern image, and best match of the individual feature is not at the same scanline in the reflected pattern image.

18. A head-mounted display device including: a display that, when in operation, outputs an image to an eye of a user; a light projector that, when in operation, emits light corresponding to a projected pattern image having a plurality of features with known locations in the projected pattern image; a camera that, when in operation, captures the light after reflection of the light by an environment of the head-mounted display device and generates a reflected pattern image as a two-dimensional (2D) projection of the environment, the reflected pattern image including a plurality of features that correspond to the features of the projected pattern image; and a processor, when in operation, performs a calibration process to update a set of calibration parameters indicative of a distance or an orientation between the light projector and the camera based on a relationship between the features in the projected pattern image and the features in the reflected pattern image.

19. The device of example 18, wherein the processor, when in operation, generates a depth map including a plurality of pixel values corresponding to depths of objects of the environment relative to the head-mounted display device, based on the set of calibration parameters that has been updated and the features in the projected pattern image and the reflected pattern image.

20. The device of example 18 or 19, wherein the processor, when in operation, minimizes a function indicative of differences between known coordinates of a pair of matching features corresponding to an object of the environment and calculated coordinates of projections of the object onto the projected pattern image and the reflected pattern image, wherein the function depends on the calibration parameters indicative of the distance or the orientation between the light projector and the camera.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:
1. A depth imaging device comprising:
a light projector that, when in operation, emits light corresponding to a projected pattern image having a plurality of features with a known illumination pattern in the projected pattern image;
a camera that, when in operation, captures the light after reflection of the light by an environment of the depth imaging device and generates a reflected pattern image as a two-dimensional (2D) projection of the environment, the reflected pattern image including a plurality of second features that correspond to the plurality of features of the projected pattern image; and
a processor configured to:
determine a relationship of a distance or a relationship of an orientation between the plurality of features in the projected pattern image and the plurality of second features in the reflected pattern image based on an intensity dissimilarity function of the plurality of features in the projected pattern image and the plurality of second features in the reflected pattern image;
identify a set of matching features based on the relationship of the distance or the relationship of the orientation along a scanline according to a 1-dimensional (1D) scanline searching process;
identify a second set of matching features based on a second relationship of the distance or a second relationship of the orientation between the plurality of features in the projected pattern image and the plurality of second features in the reflected pattern image within a range of the scanline according to a 2-dimensional (2D) scanline searching process; and
detect a misalignment between the light projector and the camera based on the set of matching features and the second set of matching features.

2. The device of claim 1, wherein the processor corrects the misalignment by updating a set of calibration parameters indicative of the distance or the orientation between the light projector and the camera.

3. The device of claim 1, wherein the processor searches the projected pattern image and the reflected pattern image for pairs of matching features, each pair including a feature from the plurality of features of the projected pattern image and a second feature of the plurality of second features from the reflected pattern image, wherein a search result is indicative of a presence of a physical distortion to the depth imaging device.

4. The device of claim 3, wherein the processor generates a depth map including a plurality of pixel values corresponding to depths of surfaces in the environment relative to the depth imaging device, based on the pairs of matching features and a set of updated calibration parameters indicative of the distance or the orientation between the light projector and the camera.

5. The device of claim 1, wherein the processor detects the misalignment based on a determination that a spatial distribution of the plurality of second features of the reflected pattern image is shifted above or below a horizontal epipolar scanline.

6. The device of claim 1, wherein the projected pattern image includes a plurality of random dots that are distributed in the projected pattern image; and
- wherein the processor detects the misalignment based on a determination that a spatial distribution of the plurality of second features of the reflected pattern image is shifted with respect to the known illumination pattern in the projected pattern image.

7. The device of claim 1, wherein for an individual feature at a scanline in the projected pattern image, the processor searches for a matching feature corresponding to the individual feature of the projected pattern image at the scanline in the reflected pattern image; and
- wherein the processor detects the misalignment based on a determination that the individual feature at the scanline in the projected pattern image does not have the matching feature at the scanline in the reflected pattern image.

8. The device of claim 1, wherein the processor searches the projected pattern image and the reflected pattern image for pairs of matching features, each pair including a feature of the plurality of features of the projected pattern image located at a scanline in the projected pattern image and a second feature of the plurality of second features of the reflected pattern image located at the scanline in the reflected pattern image; and
- wherein the processor detects the misalignment based on a determination that an average of matching scores of the pairs of matching features is below a threshold value.

9. The device of claim 1, wherein for an individual feature of the plurality of features of the projected pattern image at a scanline in the projected pattern image, the processor searches for a first matching feature corresponding to the individual feature of the projected pattern image at the scanline in the reflected pattern image; and
- wherein the processor detects the misalignment based on a determination that a second matching feature of the plurality of second features of the reflected pattern image is not at the scanline and is a better match for the individual feature than the first matching feature at the scanline in the reflected pattern image.

10. The device of claim 1, wherein the processor identifies a pair of matching features, the pair of matching features including a first feature from the plurality of features of the projected pattern image and a second feature from the plurality of features of the reflected pattern image that is a match of the first feature; and
- wherein the processor corrects the misalignment by updating a set of calibration parameters indicative of the distance or the orientation between the light projector and the camera, based on the pair of matching features and an object in the environment corresponding to the pair of matching features.

11. The device of claim 10, wherein the processor updates the set of calibration parameters by minimizing a function indicative of differences between known coordinates of the pair of matching features and calculated coordinates of projections of the object onto the projected pattern image and the reflected pattern image.

12. A method for detecting a deformation of a depth imaging device, the method comprising:
- emitting, by a light projector, light corresponding to a projected pattern image having a plurality of features with known locations in the projected pattern image;
- capturing, by a camera, the light reflected by environment of the depth imaging device;
- generating a reflected pattern image as a two-dimensional (2D) projection of the environment, the reflected pattern image including a plurality of second features that correspond to the plurality of features of the projected pattern image;
- determining a relationship of a distance or a relationship of an orientation between the plurality of features in the projected pattern image and the plurality of second features in the reflected pattern image based on an intensity dissimilarity function of the plurality of features in the projected pattern image and the plurality of second features in the reflected pattern image;
- identifying a set of matching features based on the relationship of the distance or the relationship of the orientation along a scanline according to a 1-dimensional (1D) scanline searching process;
- identifying a second set of matching features based on a second relationship of the distance or a second relationship of the orientation between the plurality of features in the projected pattern image and the plurality of second features in the reflected pattern image within a range of the scanline according to a 2-dimensional (2D) scanline searching process; and
- detecting a misalignment between the light projector and the camera based on the set of matching features and the second set of matching features.

13. The method of claim 12, further comprising:
- performing a calibration process to update a set of calibration parameters indicative of the distance or the orientation between the light projector and the camera.

14. The method of claim 12, further comprising:
- searching the projected pattern image and the reflected pattern image for pairs of matching features, each pair including a feature from the plurality of features of the projected pattern image and a second feature from the plurality of second features of the reflected pattern image.

15. The method of claim 14, further comprising:
- generating a depth map including a plurality of pixel values corresponding to depths of the environment relative to the depth imaging device, based on the pairs of matching features and a set of calibration parameters indicative of the distance or the orientation between the light projector and the camera.

16. The method of claim 12, wherein the detecting comprises:
- detecting the misalignment based on a determination that a spatial distribution of the plurality of second features in the reflected pattern image is biased toward a direction relative to a spatial distribution of the plurality of features in the projected pattern image.

17. The method of claim 12, wherein the detecting comprises:
- detecting the misalignment based on a determination that for an individual feature of the plurality of features of the projected pattern image at a scanline in the projected pattern image, and best match of the individual feature is not at a same scanline in the reflected pattern image.

18. A head-mounted display device comprising:
- a display that, when in operation, outputs an image to an eye of a user;
- a light projector that, when in operation, emits light corresponding to a projected pattern image having a plurality of features with known locations in the projected pattern image;

a camera that, when in operation, captures the light after reflection of the light by an environment of the head-mounted display device and generates a reflected pattern image as a two-dimensional (2D) projection of the environment, the reflected pattern image including a plurality of second features that correspond to the plurality of features of the projected pattern image; and a processor, when in operation:
- determines a relationship of a distance or a relationship of an orientation between the plurality of features in the projected pattern image and the plurality of second features in the reflected pattern image based on an intensity dissimilarity function of the plurality of features in the projected pattern image and the plurality of second features in the reflected pattern image;
- identifies a set of matching features based on the relationship of the distance or the relationship of the orientation along a scanline according to a 1-dimensional (1D) scanline searching process;
- identifies a second set of matching features based on a second relationship of the distance or a second relationship of the orientation between the plurality of features in the projected pattern image and the plurality of second features in the reflected pattern image within a range of the scanline according to a 2-dimensional (2D) scanline searching process; and
- performs a calibration process to update a set of calibration parameters based on the set of matching features and the second set of matching features.

19. The device of claim 18, wherein the processor, when in operation, generates a depth map including a plurality of pixel values corresponding to depths of objects of the environment relative to the head-mounted display device, based on the set of calibration parameters that has been updated and the plurality of features in the projected pattern image and the plurality of second features of the reflected pattern image.

20. The device of claim 18, wherein the processor, when in operation, minimizes a function indicative of differences between known coordinates of a pair of matching features corresponding to an object of the environment and calculated coordinates of projections of the object onto the projected pattern image and the reflected pattern image, wherein the function depends on the set of calibration parameters indicative of the distance or the orientation between the light projector and the camera.

21. The device of claim 1, wherein the processor is further configured to:
calculate the intensity dissimilarity function based on one or more candidate pixels of the reflected pattern image having an intensity dissimilarity score corresponding to one or more pixels of the projected pattern image.

22. The method of claim 12, further comprising:
calculating the intensity dissimilarity function based on one or more candidate pixels of the reflected pattern image having an intensity dissimilarity score corresponding to one or more pixels of the projected pattern image.

23. The device of claim 18, wherein the processor, when in operation, calculates the intensity dissimilarity function based on one or more candidate pixels of the reflected pattern image having an intensity dissimilarity score corresponding to one or more pixels of the projected pattern image.

24. The device of claim 1, wherein the processor is further configured to:
- compare a dissimilarity score of the set of matching features with a dissimilarity score of the second set of matching features; and
- detect the misalignment between the light projector and the camera further based on the comparison.

25. The method of claim 12, further comprising:
- comparing a dissimilarity score of the set of matching features with a dissimilarity score of the second set of matching features; and
- detecting the misalignment between the light projector and the camera further based on the comparison.

26. The device of claim 18, wherein the processor, when in operation,
- compares a dissimilarity score of the set of matching features with a dissimilarity score of the second set of matching features; and
- performs the calibration process to update the set of calibration parameters further based on the comparison.

* * * * *